(12) United States Patent
Wu et al.

(10) Patent No.: US 6,944,120 B2
(45) Date of Patent: Sep. 13, 2005

(54) METHOD AND SYSTEM FOR TIERED DIGITAL TELEVISION TERRESTRIAL BROADCASTING SERVICES USING MULTI-BIT-STREAM FREQUENCY INTERLEAVED OFDM

(75) Inventors: Yiyan Wu, Ottawa (CA); Bernard Caron, Kanata (CA)

(73) Assignee: Her Majesty the Queen in right of Canada, as represented by the Minister of Industry, Ottawa (CA)

( * ) Notice: Subject to any disclaimer, the term of this patent is extended or adjusted under 35 U.S.C. 154(b) by 858 days.

(21) Appl. No.: 09/832,799

(22) Filed: Apr. 12, 2001

(65) Prior Publication Data

US 2002/0088005 A1 Jul. 4, 2002

Related U.S. Application Data

(60) Provisional application No. 60/196,300, filed on Apr. 12, 2000.

(51) Int. Cl.[7] .............................................. H04J 11/00
(52) U.S. Cl. ...................................... 370/208; 370/203
(58) Field of Search ................................ 370/208, 203, 370/206, 207, 210, 204, 205, 484, 480, 529, 281, 295; 375/260, 259, 261, 298, 295, 308, 279–281; 381/3, 14; 455/59

(56) References Cited

U.S. PATENT DOCUMENTS

| | | | | | |
|---|---|---|---|---|---|
| 4,881,241 | A | * | 11/1989 | Pommier et al. ............ | 375/260 |
| 5,521,943 | A | * | 5/1996 | Dambacher ................. | 375/295 |
| 5,610,908 | A | * | 3/1997 | Shelswell et al. ........... | 370/210 |
| 5,757,760 | A | | 5/1998 | Shido et al. | |
| 5,799,033 | A | * | 8/1998 | Baggen ....................... | 375/250 |
| 6,075,789 | A | * | 6/2000 | Kasslin et al. .............. | 370/338 |
| 6,175,550 | B1 | | 1/2001 | Van Nee | |
| 6,181,714 | B1 | * | 1/2001 | Isaksson et al. ............ | 370/491 |
| 6,223,324 | B1 | * | 4/2001 | Sinha et al. ................. | 714/776 |
| 6,278,686 | B1 | * | 8/2001 | Alard .......................... | 370/204 |
| 6,359,926 | B1 | * | 3/2002 | Isaksson et al. ............ | 375/219 |
| 6,363,128 | B1 | * | 3/2002 | Isaksson et al. ............ | 375/355 |
| 6,366,554 | B1 | * | 4/2002 | Isaksson et al. ............ | 370/206 |
| 6,408,038 | B1 | * | 6/2002 | Takeuchi .................... | 375/341 |
| 6,438,174 | B1 | * | 8/2002 | Isaksson et al. ............ | 375/261 |
| 6,456,649 | B1 | * | 9/2002 | Isaksson et al. ............ | 375/222 |
| 6,466,629 | B1 | * | 10/2002 | Isaksson et al. ............ | 375/316 |
| 6,493,395 | B1 | * | 12/2002 | Nordstrom et al. ......... | 375/261 |
| 6,522,700 | B1 | * | 2/2003 | Zimmermann et al. ..... | 375/295 |

OTHER PUBLICATIONS

Yiyan Wu, Communications Research Centre, "Using Frequency Interleaved OFDM for Tiered Digital Television Terrestrial Broadcasting Services", Mar. 16, 2000, Canada.

* cited by examiner

Primary Examiner—Wellington Chin
Assistant Examiner—Jamal A. Fox
(74) Attorney, Agent, or Firm—Freedman & Associates (57) ABSTRACT

The invention relates to a method and system for tiered digital broadcasting. A plurality of different bit streams representing digital data targeted for different services is received from a data source. Each bit-stream of the plurality of different bit-streams is modulated on a plurality of OFDM sub-carriers. Sub-carriers of different bit streams have different spectral efficiency. The parallel OFDM sub-carriers of each bit-stream are frequency interleaved with the parallel OFDM sub-carriers of the other bit streams of the plurality of different bit streams such that the parallel OFDM sub-carriers of each bit are spread over an entire available frequency spectrum. The interleaved sub-carriers are transformed into time domain for providing a frequency interleaved OFDM signal. The OFDM signal is then upconverted to the frequency of a broadcasting channel and transmitted. The invention enables a broadcasting station to transmit multiple bit streams with different spectral efficiency using one RF channel.

21 Claims, 9 Drawing Sheets

(Prior Art)

(Prior Art)

METHOD AND SYSTEM FOR TIERED DIGITAL TELEVISION TERRESTRIAL BROADCASTING SERVICES USING MULTI-BIT-STREAM FREQUENCY INTERLEAVED OFDM

This application claims the benefit of U.S. Provisional Application No. 60/196,300 filed Apr. 12, 2000.

FIELD OF THE INVENTION

The invention relates generally to Digital Television Terrestrial Broadcasting (DTTB), in particular to a method and system for interleaving in frequency domain OFDM sub-carriers over the entire spectrum of a RF channel, wherein sub-carriers of different bit streams have different spectral efficiency.

BACKGROUND OF THE INVENTION

In North America and many other countries, each broadcast station will be loaned one 6 MHz channel to implement Digital Television Terrestrial Broadcasting (DTTB). Broadcasters have full control of that channel and have the freedom to provide any kind of services. Traditionally, terrestrial television is a fixed service, which requires stationary reception. DTTB systems are able to provide robust audio, video, and data services to fixed as well as mobile recipients using different spectral efficiencies. A DTTB system is able to provide reliable high speed data or video services to roof mounted directional antennae at a spectral efficiency of 3 to 4 bits/s/Hz and at 1 to 2 bits/s/Hz to mobile recipients.

DTTB over VHF/UHF using single carrier modulation suffers from severe multipath distortion due to signal reflections from surrounding objects—passive multipath distortion—and signals transmitted from other transmitters—active multipath distortion. In single carrier modulation (SCM) schemes a single carrier modulates an entire bit stream of digital data and the single carrier is spread over the entire bandwidth of the transmission channel. Furthermore, a signal modulated by a single carrier modulation scheme is susceptible to frequency selective fading. If an in-band spectrum notch occurs, the transmission link could be lost.

In order to overcome the drawbacks of the single carrier modulation Orthogonal Frequency Division Multiplexing (OFDM) has been implemented for digital broadcasting. For example, U.S. Pat. No. 5,757,760 issued May 26, 1998 to Sugita discloses a communication system, wherein the energy of each bit of the inputted information bit string is diffused over the whole frequency band of the orthogonal carriers. In a further advanced system disclosed in U.S. Pat. No. 6,175,550 issued Jan. 16, 2001 to van Nee the bit rate of the transmitted information can be changed by scaling the OFDM process. However, both systems are not able to transmit multiple bit streams with different spectral efficiencies.

Recently OFDM has been implemented in two DTTB standards, the European DVB-T standard and the Japanese ISDB-T standard. The OFDM is a form of a multi-carrier modulation (MCM) scheme, where data are transmitted in parallel in frequency domain on a plurality of sub-carriers. This allows recovery of the data even if some carriers are distorted. Therefore, the transmission of digital data using MCM is less susceptible to multipath distortion. In OFDM the sub-carriers are orthogonally allocated such that they do not interfere with each other. To provide some flexibility, it is possible to include in the DVB-T system hierarchical coding allowing transmission of two separate data streams. A "High priority" data stream is transmitted using modulation of high spectral efficiency and a "Low Priority" data stream is transmitted using low spectral efficiency. One of the weak points of this approach is that the reception of the "Low Priority" data requires a high Carrier to Noise (C/N) ratio resulting in reduced coverage. Therefore, hierarchical modulation has never been implemented in Europe. The ISDB-T system uses band segmented OFDM segmenting the RF channel into 13 segments. Up to three different modulations are implemented on different segments for different services. However, this approach counteracts the principle of the OFDM modulation to spread a data signal modulated onto parallel sub-carriers, preferably, over an entire RF channel to achieve frequency diversity, which gains robustness against multipath distortion. If there is severe fading over a part of the spectrum of the RF channel one or more of the 13 segments are notched out without any chance to recover the data.

It is, therefore, an object of the invention to overcome the drawbacks of the above systems in providing multiple bit streams with different spectral efficiency.

It is further an object of the invention to provide a method and system for interleaving in frequency domain OFDM sub-carriers over the entire spectrum of a RF channel, wherein sub-carriers of different bit streams have different spectral efficiency.

SUMMARY OF THE INVENTION

In accordance with the present invention there is provided a method for interleaving sub-carriers of a plurality of different bit streams in frequency domain comprising the steps of:

modulating each bit-stream of the plurality of different bit-streams on a plurality of OFDM sub-carriers;

converting each modulated bit stream on a plurality of parallel OFDM sub-carriers in frequency domain; and, frequency interleaving the parallel OFDM sub-carriers of each bit-stream with the parallel OFDM sub-carriers of the other bit streams of the plurality of different bit streams such that the parallel OFDM sub-carriers of each bit-stream are spread over an entire available frequency spectrum.

In accordance with the present invention there is further provided a method for tiered digital broadcasting comprising the steps of:

receiving a plurality of different bit streams, wherein each bit stream represents digital data targeted for a different service;

modulating each bit-stream of the plurality of different bit-streams on a plurality of OFDM sub-carriers, wherein the sub-carriers of different bit streams have different spectral efficiency;

converting each modulated bit stream on a plurality of parallel OFDM sub-carriers in frequency domain;

frequency interleaving the parallel OFDM sub-carriers of each bit-stream with the parallel OFDM sub-carriers of the other bit streams of the plurality of different bit streams such that the parallel OFDM sub-carriers of each bit-stream are spread over an entire available frequency spectrum;

transforming the interleaved sub-carriers into time domain for providing a frequency interleaved OFDM signal;

upconverting the frequency interleaved OFDM signal to the frequency of a broadcasting channel: and, transmitting the upconverted signal.

In accordance with an aspect of the present invention there is provided a method for tiered digital broadcasting comprising the steps of:

receiving the transmitted OFDM signal;

transforming the received OFDM signal into frequency domain using FFT;

de-packaging the transformed OFDM signal in order to conjoin the sub-carriers belonging to each different bit stream; and, decoding at least one bit stream and providing digital data in dependence thereupon.

In accordance with another aspect of the present invention there is provided a system for tiered digital broadcasting comprising:

a port for receiving a plurality of different bit streams, wherein each bit stream represents digital data targeted for a different service;

a processor for modulating each bit-stream of a plurality of different bit-streams on a plurality of parallel OFDM sub-carriers, for frequency interleaving the parallel OFDM sub-carriers of each bit-stream with the parallel OFDM sub-carriers of the other bit streams of the plurality of different bit streams such that the parallel OFDM sub-carriers of each bit-stream are spread over an entire available frequency spectrum and for transforming the interleaved sub-carriers into time domain providing a frequency interleaved OFDM signal;

a D/A converter for converting the frequency interleaved OFDM signal; and, a RF upconverter for upconverting the signal to a broadcaster's RF frequency for transmission.

In accordance with the other aspect of the present invention there is further provided a system for tiered digital broadcasting comprising:

a second other port for receiving the transmitted OFDM signal;

a tuner for downconverting the received OFDM signal;

an A/D converter for converting the OFDM signal; and, a processor for low pass filtering the OFDM signal, for transforming the OFDM signal into frequency domain using FFT, for de-packaging the transformed OFDM signal in order to conjoin the sub-carriers belonging to each different bit stream, and for decoding at least one bit stream and providing digital data in dependence thereupon.

BRIEF DESCRIPTION OF THE FIGURES

Exemplary embodiments of the invention will now be described in conjunction with the following drawings, in which.

DETAILED DESCRIPTION OF THE PREFERRED EMBODIMENTS

Digital Television Terrestrial Broadcasting (DTTB) over VHF/UHF using single carrier modulation suffers from severe multipath distortion due to signal reflections from surrounding objects—passive multipath distortion—and signals transmitted from other transmitters—active multipath distortion. In single carrier modulation (SCM) schemes a single carrier modulates an entire bitstream of digital data and the single carrier is spread over the entire bandwidth of the transmission channel. Furthermore, a signal modulated by a single carrier modulation scheme is susceptable to frequency selective fading. If an in-band spectrum notch occurs, the transmision link could be lost.

In order to overcome the drawbacks of the single carrier modulation Orthogonal Frequency Division Multiplexing (OFDM) has been implemented in two DTTB standards, the European DVB-T standard and the Japanese ISDB-T standard. The OFDM is a form of a multi-carrier modulation (MCM) scheme, where data are transmitted in parallel in frequency domain on a plurality of sub-carriers. This allows recovery of the data even if some carriers are distorted. Therefore, the transmission of digital data using MCM is less susceptible to multipath distortion. In OFDM the sub-carriers are orthogonally allocated that they do not interfere with each other.

Figure 1:
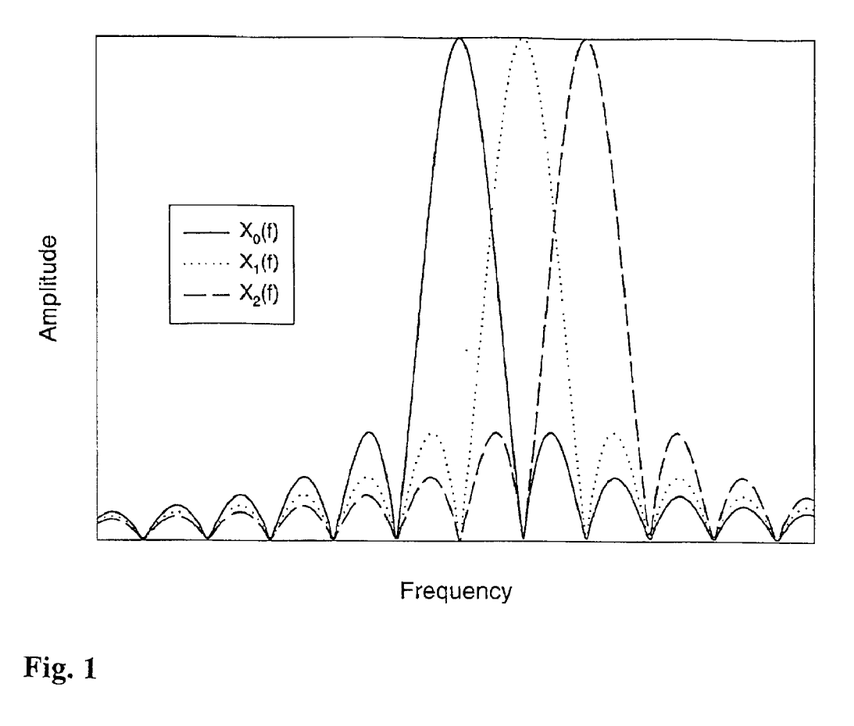
FIG. 1 illustrates an OFDM spectrum comprising 3 carriers.

The following example describes the implementation of an OFDM. The spectrum of the digital data signal is divided into smaller sub-bands and each sub-band is modulated by a different carrier frequency, wherein the carrier frequencies are orthogonal to each other. Let the spectra of three OFDM sub-carriers be defined as:

$$x_0(n) = \begin{cases} 1 & 0 \leq n \leq N-1 \\ 0 & \text{otherwise} \end{cases} \quad (1)$$

$$x_1(n) = \begin{cases} e^{j2\pi n/N} & 0 \leq n \leq N-1 \\ 0 & \text{otherwise} \end{cases} \quad (2)$$

$$x_2(n) = \begin{cases} e^{j4\pi n/N} & 0 \leq n \leq N-1 \\ 0 & \text{otherwise} \end{cases} \quad (3)$$

Where $x_0(n)$ is a N-point rectangular pulse, $x_1(n)$ is a single cycle of a complex sinusoid and $x_2(n)$ is two cycles of a complex sinusoid, each defined over a N-point interval. The spectrum of the three combined signals is shown in FIG. 1. The spectrum of each OFDM carrier has one main lobe and N−1 zeros. The main lobe of each OFDM carrier overlaps with the zeros of every other OFDM carrier. This condition remains as long as the frequencies remain orthogonal.

By extending this example, it is possible to design a signal comprising N sub-carriers, each carrying a different symbol of information. Let the $k^{th}$ sub-carrier transmitting symbol $m_k$ be defined as:

$$x_k(n) = \begin{cases} m_k e^{j2\pi kn/N} & 0 \le n \le N-1 \\ 0 & \text{otherwise} \end{cases} \quad (4)$$

The sum of N carriers is then given by $$x(n) = \begin{cases} \sum_{k=0}^{N-1} m_k e^{j2\pi kn/N} & 0 \le n \le N-1 \\ 0 & \text{otherwise} \end{cases} \quad (5)$$

Which is equivalent to $$x(n) = \begin{cases} N\left[\frac{1}{N}\sum_{k=0}^{N-1} m_k W_N^{-kn}\right] & 0 \le n \le N-1 \\ 0 & \text{otherwise} \end{cases} \quad (6)$$

with the substitution $W_N = e^{-j2\pi/N}$.

In equation (6) the term in brackets is the Inverse Discrete Fourier Transform (IDFT). Therefore, computing the IDFT on a sequence of parallel symbols and multiplying the result by N generates an OFDM symbol.

At the receiver, the sequence of parallel symbols is recovered by computing the Discrete Fourier Transform (DFT) on the OFDM symbol. In practice the DFT and IDFT are implemented as Fast Fourier Transforms (FFT) and (IFFT), respectively.

Figure 2:
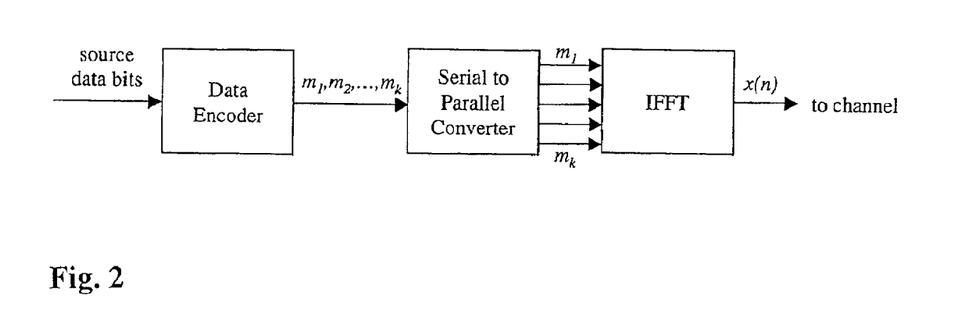
FIG. 2 is a simplified block diagram of an OFDM modulator.

Referring to FIG. 2 a simplified block diagram of an OFDM modulator is shown. Source data are encoded using a data encoder for providing data symbols $m_1, M_2, \ldots m_k$. Each of the data symbols is then modulated onto a carrier in a serial to parallel converter according to equation (4). A sum of parallel carriers, see equation (5) is then transformed into time domain using IFFT—equation (6) for transmission.

The transmission of any signal over a terrestrial channel is always susceptible to multipath interference. To protect multi-carrier symbols against multipath propagation effects a block of known data—called the guard interval—is inserted at the beginning of the symbol before transmission. The guard interval contains a fraction of the original symbol. Since the carriers within a symbol are cyclic, the addition of a guard interval is also cyclic. From this results that as long as the delay of the multipath is shorter than the guard interval all the components at the input of the FFT are from a same symbol and the orthogonality criteria will be maintained after the FFT is computed.

Figure 3:
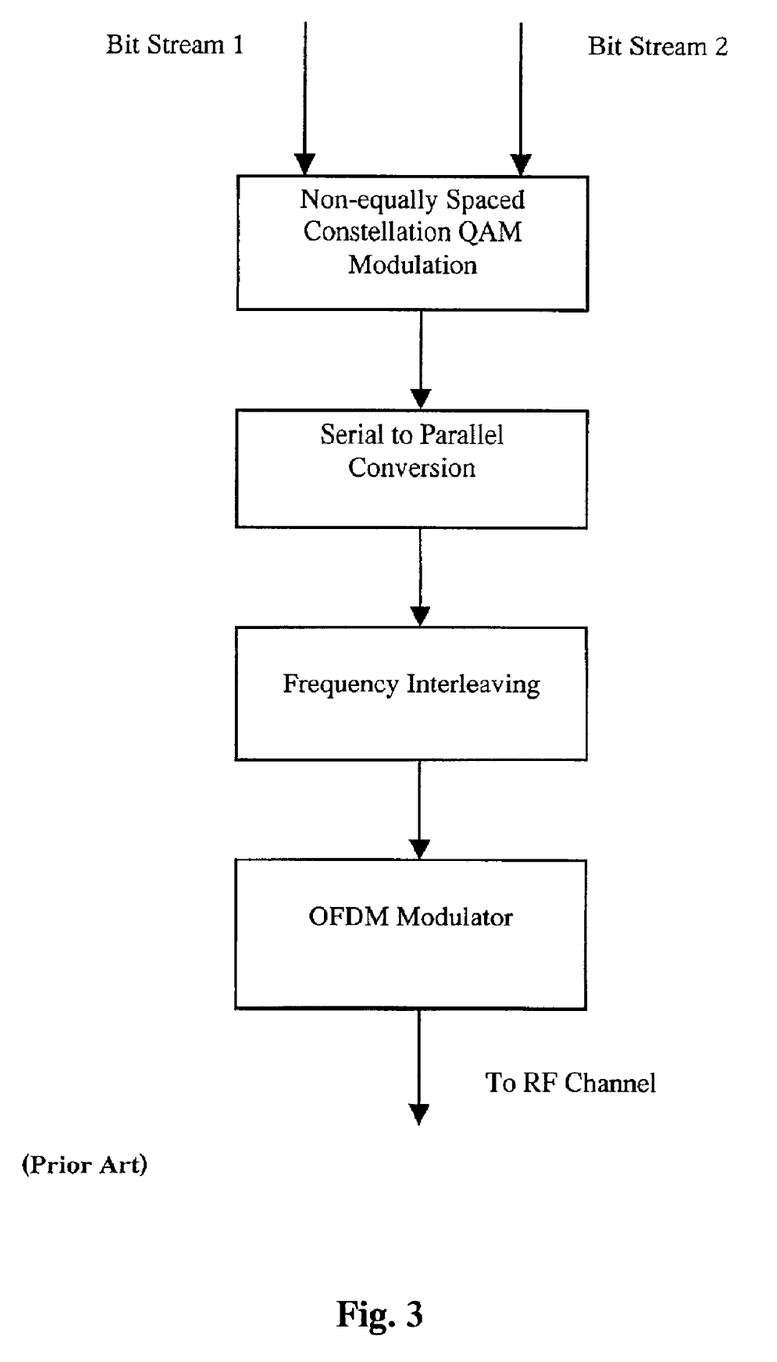
FIG. 3 is a simplified block diagram of an OFDM process used in a DVB-T system.

The DVB-T system uses identical sub-carriers for modulating the digital broadcast signal over an entire Radio Frequency (RF) channel. To provide some flexibility, it is possible to include in the DVB-T system hierarchical coding with a non-uniform Quadrature Amplitude Modulation (QAM) allowing transmission of two separate data streams. A "High priority" data stream is transmitted using 16 or 64 QAM and a "Low Priority" data stream is transmitted using Quadrature Phase Shift Keying (QPSK), as shown in FIG. 3. This allows a high-end receiver to decode the 16 or 64 QAM signal while a lower grade receiver decodes the QPSK signal. This allows, for example, fixed receivers to decode a high quality video signal, while mobile receivers could decode a lower quality video signal. One of the weak points of this approach is that the reception of the "Low Priority" data requires a high Carrier to Noise (C/N) ratio resulting in reduced coverage. Therefore, hierarchical modulation has never been implemented in Europe.

Figure 4:
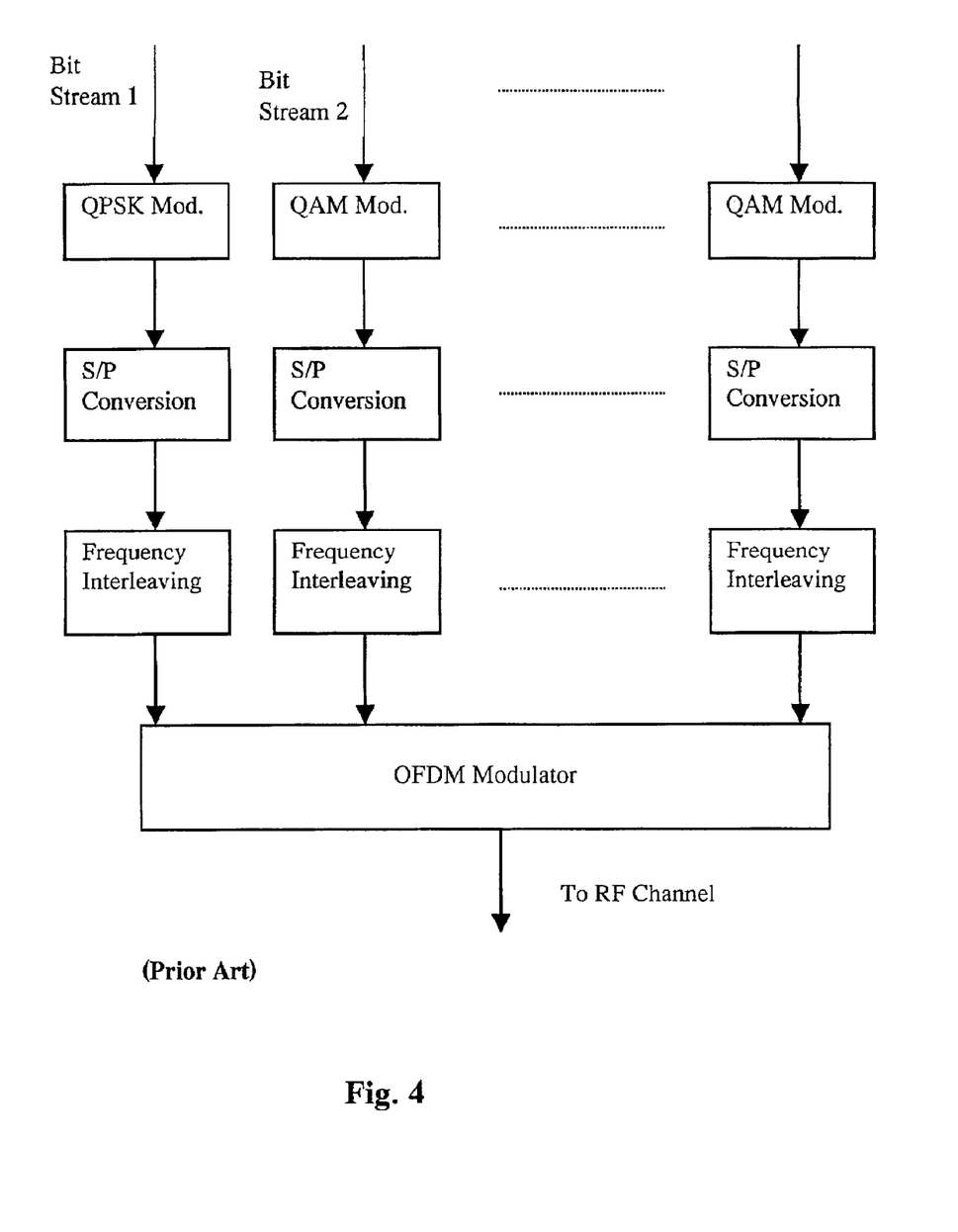
FIG. 4 is a simplified block diagram of an OFDM process used in an ISDB-T system.

The ISDB-T system uses band segmented OFDM segmenting the RF channel into 13 segments. Up to three different modulations are implemented on different segments for different services such as audio, video, or data to fixed or mobile receivers, as shown in FIG. 4. However, this approach counteracts the principle of the OFDM modulation to spread a data signal modulated onto parallel sub-carriers, preferably, over an entire RF channel to achieve frequency diversity, which gains robustness against multipath distortion. If there is severe fading over a part of the spectrum of the RF channel one or more of the 13 segments are notched out without any chance to recover the data.

Figure 5:
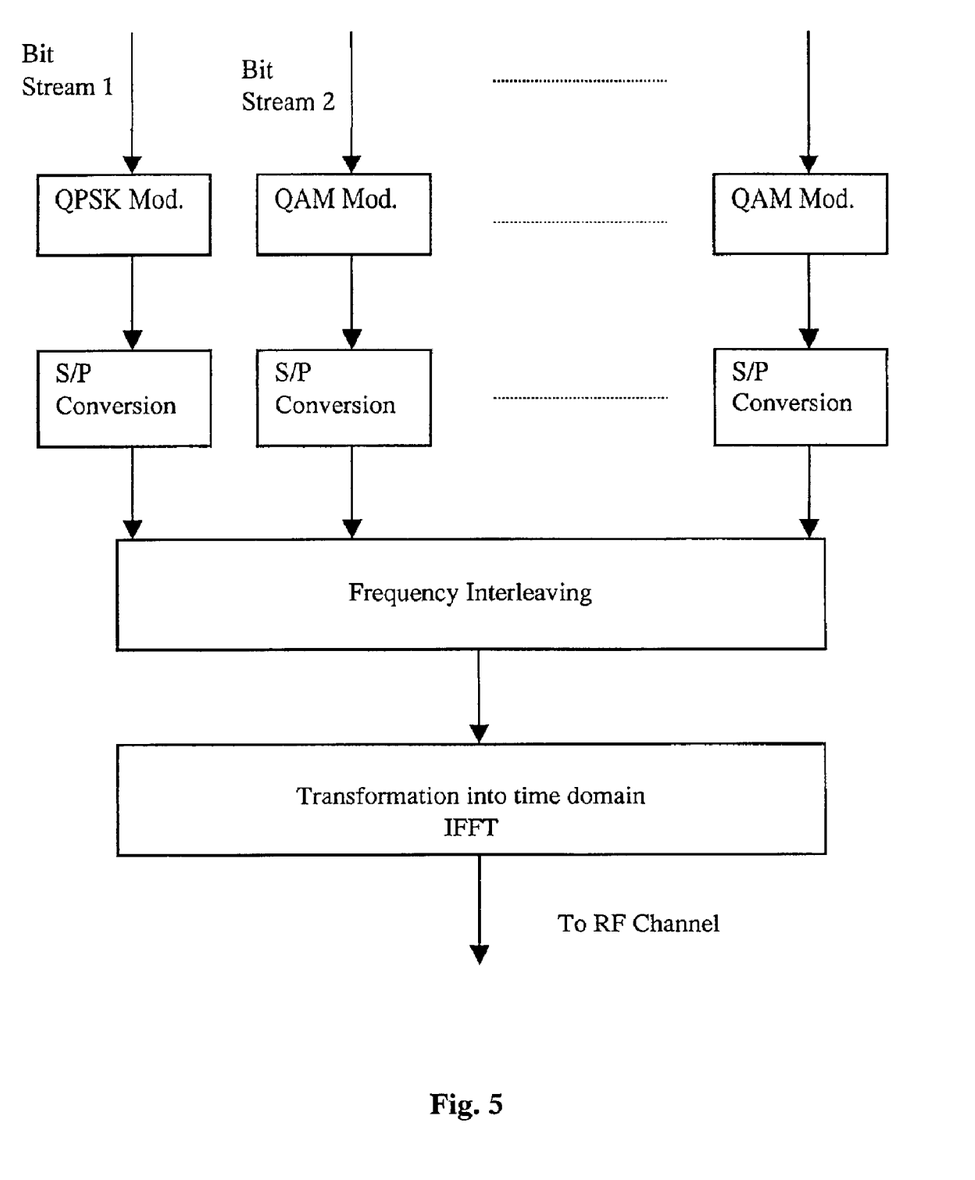
FIG. 5 is a simplified block diagram of a multi bit stream frequency interleaved OFDM process according to the invention.

The Multi-bit-stream Frequency Interleaved OFDM (MFIOFDM) process according to the invention overcomes the drawbacks of the above systems by interleaving OFDM sub-carriers of different modulation for carrying different bit-streams in frequency domain over the entire spectrum of a RF channel. FIG. 5 illustrates schematically the method of MFIOFDM according to the invention. Each bit-stream of a plurality of different bit-streams representing digital data targeted for different services is modulated on a plurality of OFDM sub-carriers using, for example, different modulations such as QPSK/DQPSK, 16 QAM, or 64 QAM for different bit-streams. Serial to parallel conversion provides each bit-stream modulated on a plurality of parallel sub-carriers in frequency domain. In the following step of frequency interleaving the parallel sub-carriers of each bit-stream are spread in frequency domain as much as possible over the entire spectrum of a RF channel. The interleaved sub-carriers are then transformed into time domain using IFFT or OFDM modulation. A broadcasting station is then enabled to upconvert the frequency interleaved OFDM signal after the IFFT to the frequency of its broadcasting channel for transmission.

Optionally, during the modulation process the bit streams are coded using a Forward Error Correction (FEC) code allowing to correct errors that might occur during transmission.

Figure 6:
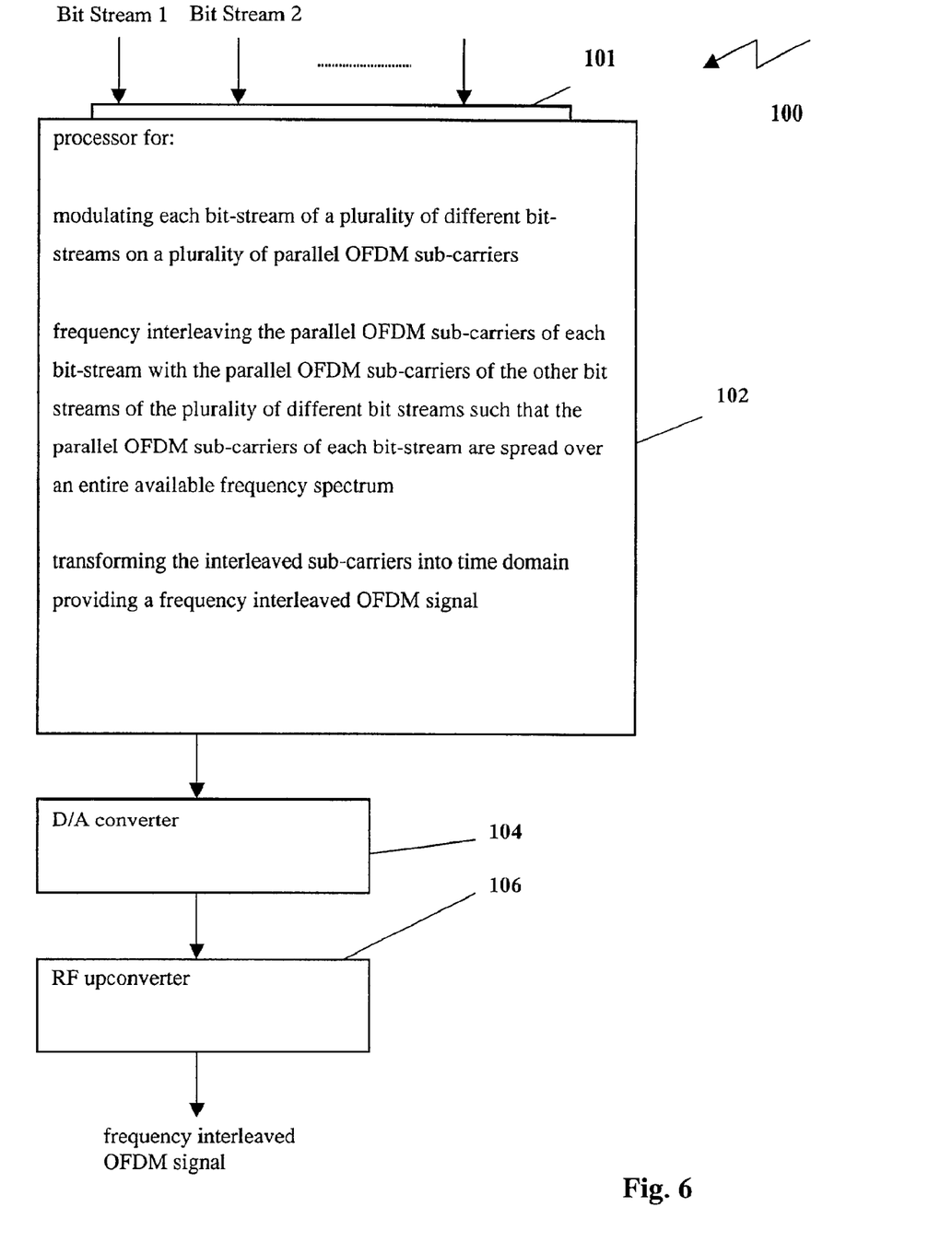
FIG. 6 is a simplified block diagram of a system for broadcasting multi bit streams according to the invention based on the process illustrated in FIG. 5.

FIG. 6 illustrates schematically a system 100 for broadcasting a plurality of bit-streams of digital data according to the invention. A data source provides a plurality of bit-streams of digital data to a processor 102 via port 101. Using the processor 102 each bit-stream of the plurality of bit-streams is modulated on a plurality of parallel OFDM sub-carriers in frequency domain. The parallel sub-carriers of each bit-stream are then spread in frequency as much as possible over the entire spectrum of a RF channel using frequency interleaving and then converted from frequency domain into time domain using IFFT. The digital signal is then converted into an analog signal using D/A converter 104 before provision to RF Upconverter 106 for upconverting the signal to a broadcaster's RF frequency for transmission.

Alternatively, but not preferably, the steps of frequency domain modulation, frequency interleaving and IFFT are performed using analog devices instead of a digital processor. However, the use of analog devices will result in a loss of accuracy.

Figure 7:
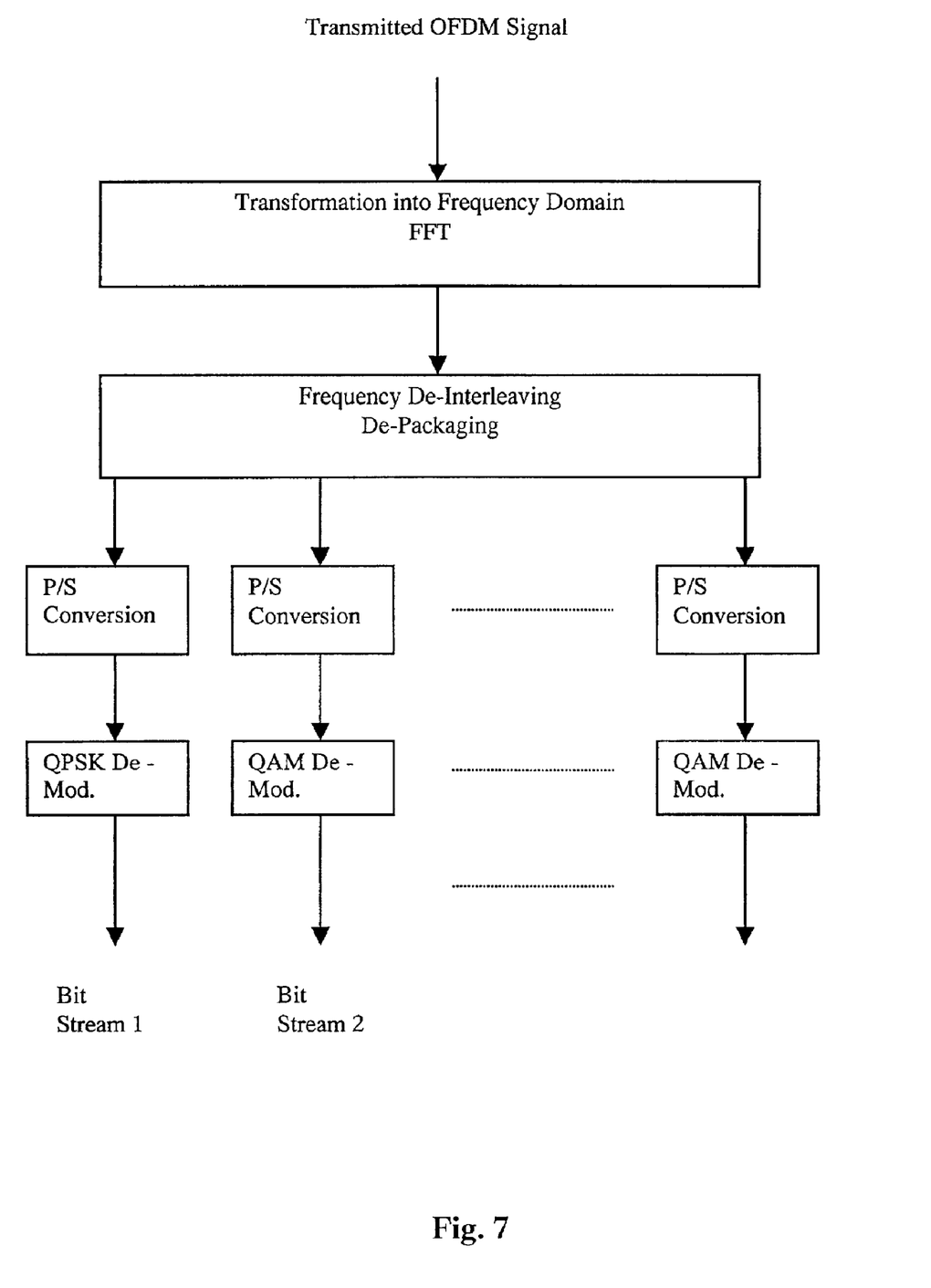
FIG. 7 is a simplified block diagram of a method for de-modulating frequency interleaved multi bit streams according to the invention.
Figure 8:
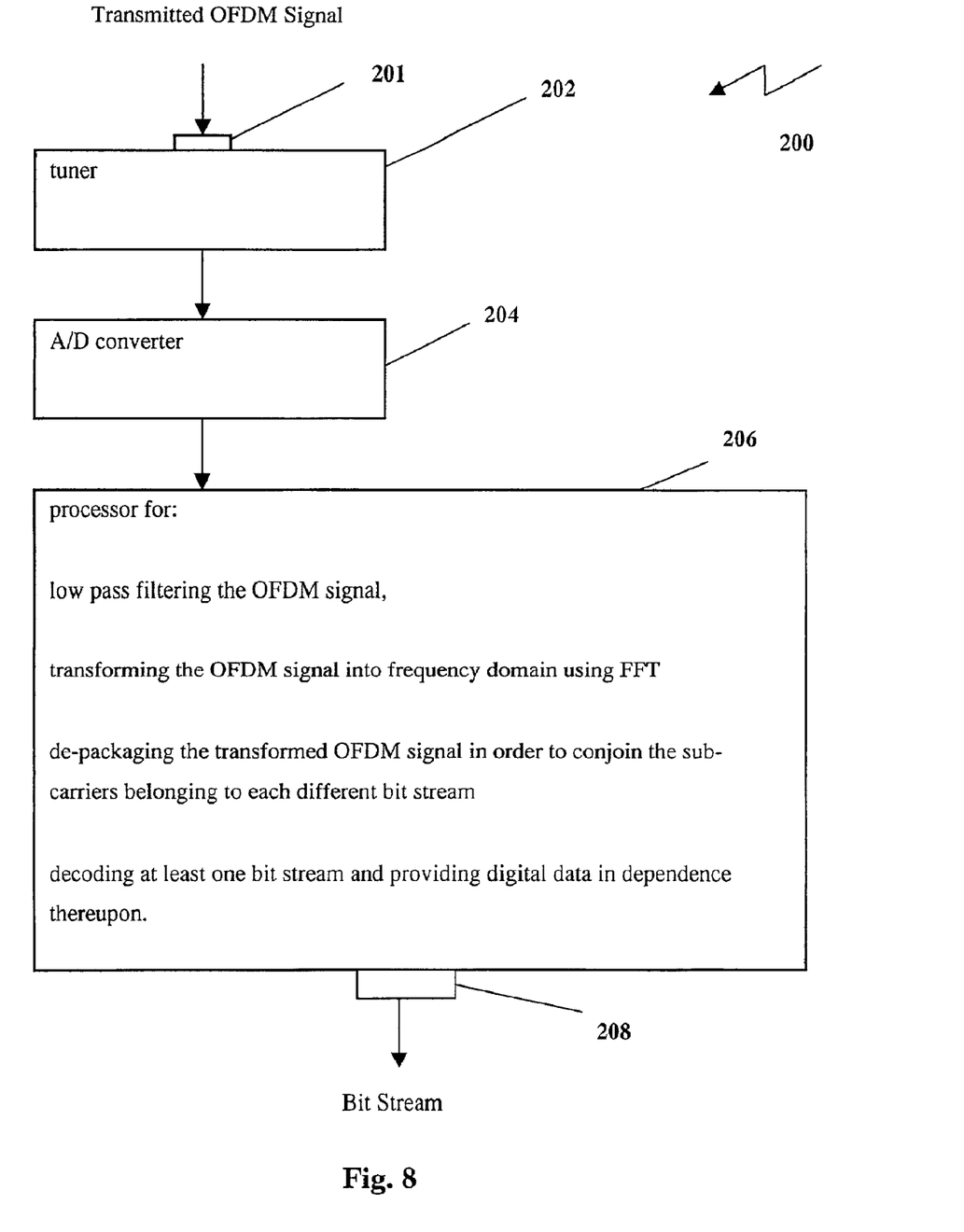
FIG. 8 is a simplified block diagram of a system for de-modulating frequency interleaved multi bit streams according to the invention based on the process shown in FIG. 7.

At the receiving end, shown in FIGS. 7 and 8 a tuner 202 of a system 200 according to the invention downconverts the transmitted signal received from port 201. The signal is provided to a processor 206 after conversion in A/D converter 204. After low-pass filtering to remove intermodulation products resulting from the downconversion the processor 206 basically reverses the MFIOFDM process shown in FIG. 5. The signal is FFT transformed into frequency domain using FFT as the OFDM demodulator. The output is de-packaged in order to reverse the frequency interleaving and to conjoin the sub-carriers belonging to each different bit stream. At least one of the bit-streams is fed to a channel decoder. The decoded digital data is then, for instance, provided to a digital TV set for display on a screen or to a computer for further processing. It is likely that only one bit-stream is decoded, for example, in digital TV reception. Alternatively, a plurality of bit-streams are decoded, for example, for display of additional digital data such as stock market updates or weather updates on the TV screen.

Figure 9:
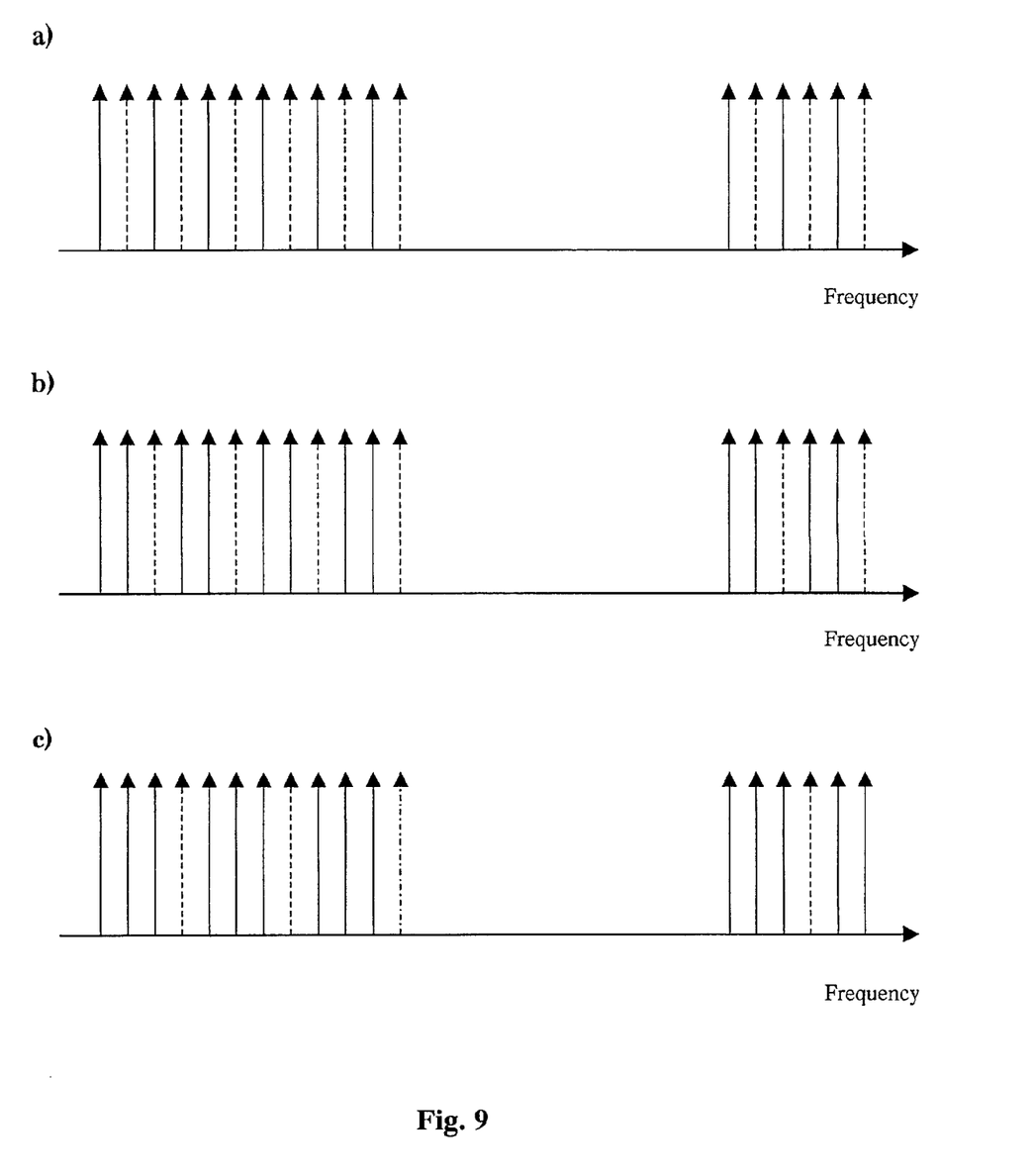
FIG. 9 illustrates different ways to arrange frequency interleaved OFDM sub-carriers within a RF channel based on the process shown in FIG. 5; and, FIG. 10 illustrates simultaneous transmission of multi bit stream frequency interleaved ODFM sub-carriers with an analog TV signal.

As is evident to those of skill in the art, there are numerous ways to frequency interleave the sub-carriers in the MFIOFDM process according to the invention. For example, in a two-tier system for fixed and mobile reception a high modulated bit stream for fixed reception and a lower modulated bit stream for mobile reception OFDM sub-carriers with the different modulation are frequency interleaved over an entire RF channel in numerous ways. FIG. 9 illustrates some ways to frequency interleave the sub-carriers of high modulated—solid arrows—and low modulated—dashed arrows—bit streams:

a) high modulated and low modulated sub-carriers are alternated;
b) two high modulated sub-carriers are followed by a low modulated sub-carrier; and,
c) three high modulated sub-carriers are followed by a low modulated sub-carrier.

In a) half the RF channel is allocated for each service, i.e. one high modulated (e.g. using 64 QAM) sub-carrier carries a bit stream for fixed reception, the next sub-carrier a low modulated carrier (e.g. using QPSK or DQPSK) carries another bit stream for mobile reception. The third sub-carrier then carries a bit stream for fixed reception, and so on. In b) two sub-carriers are allocated for fixed reception followed by one sub-carrier for mobile reception, i.e. ⅔ of the RF channel is used for fixed reception. This enhances signal quality for users having fixed reception, which is preferred because such users are more likely to have a large TV screen and want to enjoy high resolution picture quality than users of mobile reception. In c) ¾ of the RF channel is used for fixed reception giving even more priority to fixed reception. As is evident, in any case shown in FIG. 9 the MFIOFDM process according to the invention spreads the high and low modulated sub-carriers over the entire RF channel taking full advantage of the nature of the OFDM process.

The above example illustrated the frequency interleaving using the MFIOFDM process according to the invention applied to a two-tier system for simplicity. Of course, it is possible to apply the MFIOFDM process to systems having any number of tiers. For example, a broadcasting station provides DTTB for fixed and mobile reception as well as additional services using one RF channel.

Optionally, the frequency interleaving is varied in time. This allows a broadcasting station to change priorities given to various services according to consumer demand. The priorities are changed during a day, from weekday to weekend or holiday. For example, during rush hour half the RF channel is allocated for each service—fixed and mobile reception—while during prime time ¾ of the RF channel is allocated for fixed reception.

Further optionally, the OFDM sub-carriers are statistically interleaved using a fixed or time varying pseudo-random sequence to further increase frequency diversity.

Figure 10:
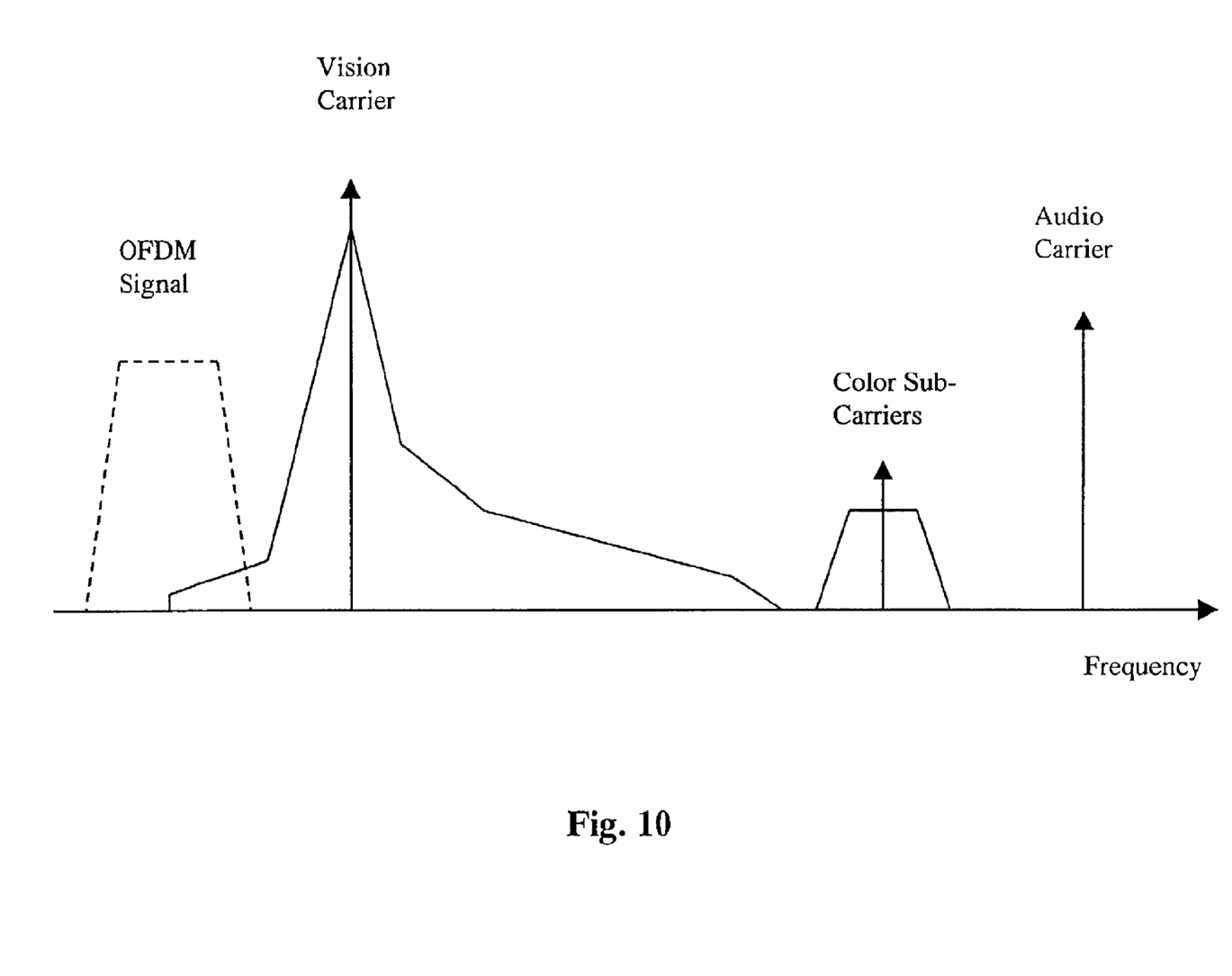

FIG. 10 illustrates another application of the MFIOFDM process according to the invention. Here, frequency interleaving is used to avoid predetermined portions of a RF channel in order to reduce a possible interference with other services. For example, during the transition period from analog to digital TV it is desirable to avoid the portions of the RF channel where the analog TV signal is transmitted. As shown in FIG. 10, the sub-carriers provided by the MFIOFDM process are transmitted together with the analog TV signal but are limited to a portion of the RF channel located in the vestigial sideband of the Vision Carrier of the analog TV signal. This allows transmission of the MFIOFDM sub-carriers together with an analog TV signal while interference is substantially reduced.

The MFIOFDM process according to the invention is easily implemented in existing DTTB systems with very little hardware changes. Basically, only the "data packaging block" before the IFFT has to be changed to implement the frequency interleaving according to the invention in a transmitter. In a receiver it is the "data de-packaging block" after the FFT, respectively, that has to be changed. Generally, the data processing in such systems is hardwired. Therefore, the change of the "data packaging block" requires just a change of a processor.

Numerous other embodiments of the invention will be apparent to persons skilled in the art without departing from the spirit and scope of the invention as defined in the appended claims.

What is claimed is:

1. A method for interleaving sub-carriers of a plurality of different bit streams in frequency domain comprising the steps of:
    modulating each bit-stream of the plurality of different bit-streams on a plurality of OFDM sub-carriers;
    converting each modulated bit stream on a plurality of parallel OFDM sub-carriers in frequency domain; and,
    frequency interleaving the parallel OFDM sub-carriers of each bit-stream with the parallel OFDM sub-carriers of the other bit streams of the plurality of different bit streams such that the parallel OFDM sub-carriers of each bit-stream are spread over an entire available frequency spectrum.

2. A method for interleaving sub-carriers of a plurality of different bit streams in frequency domain as defined in claim 1, wherein the sub-carriers of different bit streams have different spectral efficiency.

3. A method for interleaving sub-carriers of a plurality of different bit streams in frequency domain as defined in claim 2, wherein the sub-carriers of the different bit streams are alternated in a predetermined fashion.

4. A method for interleaving sub-carriers of a plurality of different bit streams in frequency domain as defined in claim 3, wherein the available frequency spectrum is equally divided between the different bit streams resulting in a substantially equal number of sub-carriers for each bit stream.

5. A method for interleaving sub-carriers of a plurality of different bit streams in frequency domain as defined in claim 3, wherein the available frequency spectrum is unequally divided between the different bit streams resulting in a different number of sub-carriers for different bit streams.

6. A method for interleaving sub-carriers of a plurality of different bit streams in frequency domain as defined in claim 3, wherein the predetermined fashion is time varying.

7. A method for interleaving sub-carriers of a plurality of different bit streams in frequency domain as defined in claim 2, wherein the sub-carriers are interleaved statistically using a pseudo-random sequence.

8. A method for interleaving sub-carriers of a plurality of different bit streams in frequency domain as defined in claim 7, wherein the pseudo-random sequence is time varying.

9. A method for tiered digital broadcasting comprising the steps of: receiving a plurality of different bit streams, wherein each bit stream represents digital data targeted for a different service;

modulating each bit-stream of the plurality of different bit-streams on a plurality of OFDM sub-carriers, wherein the sub-carriers of different bit streams have different spectral efficiency;

converting each modulated bit stream on a plurality of parallel OFDM sub-carriers in frequency domain;

frequency interleaving the parallel OFDM sub-carriers of each bit-stream with the parallel OFDM sub-carriers of the other bit streams of the plurality of different bit streams such that the parallel OFDM sub-carriers of each bit-stream are spread over an entire available frequency spectrum;

transforming the interleaved sub-carriers into time domain for providing a frequency interleaved OFDM signal;

upconverting the frequency interleaved OFDM signal to the frequency of a broadcasting channel: and, transmitting the upconverted signal.

10. A method for tiered digital broadcasting as defined in claim 9, wherein the step of modulating each bit-stream comprises coding based on a Forward Error Correction code.

11. A method for tiered digital broadcasting as defined in claim 9, wherein the interleaved sub-carriers are transformed into time domain using IFFT.

12. A method for interleaving sub-carriers of a plurality of different bit streams in frequency domain as defined in claim 11, wherein the sub-carriers of different bit streams have different spectral efficiency.

13. A method for tiered digital broadcasting as defined in claim 12, wherein the available frequency spectrum comprises the entire spectrum of a RF channel.

14. A method for tiered digital broadcasting as defined in claim 12, wherein the available frequency spectrum comprises a portion of the spectrum of a RF channel.

15. A method for tiered digital broadcasting as defined in claim 14, wherein the OFDM signal is combined with an analog TV signal.

16. A method for tiered digital broadcasting as defined in claim 11, comprising the steps of:

receiving the transmitted OFDM signal;

transforming the received OFDM signal into frequency domain using FFT;

de-packaging the transformed OFDM signal in order to conjoin the sub-carriers belonging to each different bit stream; and, decoding at least one bit stream and providing digital data in dependence thereupon.

17. A method for tiered digital broadcasting as defined in claim 16, comprising the step of downconverting the received OFDM signal.

18. A method for tiered digital broadcasting as defined in claim 17, comprising the step of A/D converting the OFDM signal.

19. A method for tiered digital broadcasting as defined in claim 18, comprising the step of low-pass filtering the OFDM signal.

20. A system for tiered digital broadcasting comprising:

a port for receiving a plurality of different bit streams, wherein each bit stream represents digital data targeted for a different service;

a processor for modulating each bit-stream of a plurality of different bit-streams on a plurality of parallel OFDM sub-carriers, for frequency interleaving the parallel OFDM sub-carriers of each bit-stream with the parallel OFDM sub-carriers of the other bit streams of the plurality of different bit streams such that the parallel OFDM sub-carriers of each bit-stream are spread over an entire available frequency spectrum and for transforming the interleaved sub-carriers into time domain providing a frequency interleaved OFDM signal;

a D/A converter for converting the frequency interleaved OFDM signal; and, a RF upconverter for upconverting the signal to a broadcaster's RF frequency for transmission.

21. A system for tiered digital broadcasting as defined in claim 20, comprising:

a second other port for receiving the transmitted OFDM signal;

a tuner for downconverting the received OFDM signal;

an A/D converter for converting the OFDM signal; and, a processor for low pass filtering the OFDM signal, for transforming the OFDM signal into frequency domain using FFT, for de-packaging the transformed OFDM signal in order to conjoin the sub-carriers belonging to each different bit stream, and for decoding at least one bit stream and providing digital data in dependence thereupon.

* * * * *